United States Patent Office 2,873,473
Patented Feb. 17, 1959

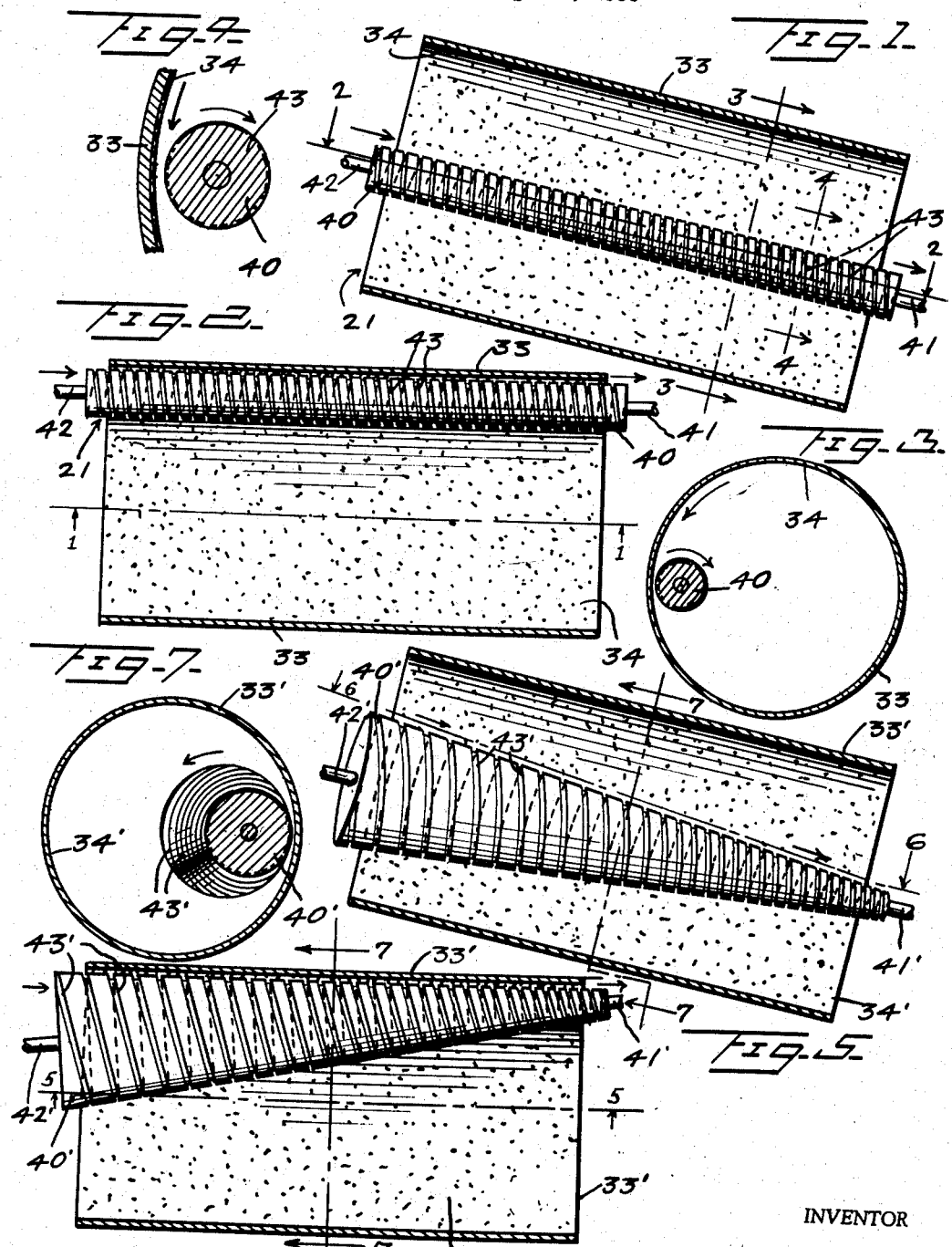

2,873,473

SEA FOOD PROCESSING APPARATUS

Melroy M. Martinez, New Orleans, La.

Application August 27, 1956, Serial No. 606,298

2 Claims. (Cl. 17—2)

The present invention relates to sea food processing apparatus.

The primary object of the invention is to provide apparatus for processing sea food which will, in the case of shrimp, remove the legs, shell, head, and clean the shrimp to produce a marketable product.

Another object of the invention is to provide sea food processing apparatus which will automatically feed the sea food through the processing portions of the apparatus without requiring the use of special conveyors.

A further object of the invention is to provide sea food processing apparatus including sea food engaging members.

Other objects and advantages will become apparent in the following specification when considered in the light of the attached drawings, in which:

Figure 1 is a vertical cross-section of the invention taken along the line 1—1 of Figure 2, looking in the direction of the arrows.

Figure 2 is a horizontal cross-section taken along the line 2—2 of Figure 1, looking in the direction of the arrows.

Figure 3 is a transverse cross-section taken along the line 3—3 of Figure 1, looking in the direction of the arrows.

Figure 4 is an enlarged fragmentary transverse cross-section taken along the line 4—4 of Figure 1, looking in the direction of the arrows.

Figure 5 is a vertical cross-section taken along the line 5—5 of Figure 6, looking in the direction of the arrows, and illustrating a modified form of the invention.

Figure 6 is a longitudinal cross-section taken along the line 6—6 of Figure 5, looking in the direction of the arrows.

Figure 7 is a transverse cross-section taken along the line 7—7 of Figure 5, looking in the direction of the arrows.

Referring now to the drawings in detail wherein like reference characters indicate like parts throughout the several figures, the reference numeral 21 indicates generally a sea food processing apparatus constructed in accordance with the invention.

The sea food processing apparatus 21 includes a cylindrical member 33 which is carried on and driven by any suitable means (not shown) and is provided with an internal abradant material coating 34. A shaft 40 is provided with reduced opposite end portions 41 and 42 for mounting in suitable bearings (not shown) and has the surface thereof spirally grooved as at 43 for reasons to be assigned.

The shaft 40 is mounted within the cylinder 33 so that the outer surface of the shaft 40 is closely adjacent to but slightly spaced from the inner abraded surface 34 of the cylindrical member 33.

In the use and operation of the invention illustrated in Figures 1 through 4, the cylinder 33 and shaft 40 are adapted to have shrimp and other sea food passed therealong so that the combined action of the shaft 40 and the cylinder 33 causes the shrimp to lie lengthwise from head to tail touching both the rotating cylinder 33 and the rotating disc 40.

The downward motion of the rotating cylinder 33 and the upward motion of the rotating shaft 40 creates a rolling, squeezing, grabbing, or shearing action on the hull or shell of the shrimp. The rolling action loosens the meat from the inside of the shell and causes a crushing action on the larger hollow head section. The downward abrasive action of the abrasive surface 34, travelling approximately three times faster than the upward rolling motion of the shaft 40, shears off the legs of the shrimp and grabs the shell tearing it open and away from the meat.

Referring now specifically to Figures 5 through 7, there is disclosed a modification wherein a cylinder 33' is provided with an internal abradant surface 34' and is mounted on and driven by suitable means (not shown). A conical shaft 40' is positioned within the cylinder 33' with the surface thereof spaced from but closely adjacent to the internal surface of the cylinder 33'. The conical shaft 40' is provided with a reduced end portion 41' adjacent its larger end, and a reduced end portion 42' adjacent its smaller end. The surface of the conical shaft 40' is spirally grooved as at 43' to feed shrimp therealong.

The operation of the modification illustrated in Figures 5 through 7 is identical to that of the form of the invention illustrated in Figures 1 through 4 with the exception that the relative speeds between the surface of the shaft 40' and the interior of the cylinder 33' will be greatest at the largest or left end of the shaft 40', as viewed in Figure 5 and will decrease toward the smallest or right end thereof. This change in relative speed from one end of the shaft 40' to the other will reduce the action on the shrimp as it becomes more nearly completely processed.

Having thus described the preferred embodiments of the invention, it should be understood that numerous structural modifications and adaptations may be resorted to without departing from the scope of the appended claims.

What is claimed is:

1. A sea food processing apparatus including a rotating cylindrical member, an abrading surface formed internally of said cylindrical member, a conical shaft having its axis extending at an angle to the axis of said cylindrical member with the surface of said shaft adjacent said cylindrical member arranged in parallel closely spaced proximity to the abrading surface of said rotating cylindrical member, said shaft having the surface thereof spirally grooved to feed shrimp therealong in contact with said abrading surface in said rotating cylindrical member.

2. A device as claimed in claim 1 wherein said shaft and cylindrical member rotate oppositely.

References Cited in the file of this patent

UNITED STATES PATENTS

| | | |
|---|---|---|
| 811,652 | Mitchell et al. | Feb. 6, 1906 |
| 1,116,221 | Beyschlag | Nov. 3, 1914 |
| 2,072,598 | Kile | Mar. 2, 1937 |